US012507151B2

(12) United States Patent
Liu et al.

(10) Patent No.: US 12,507,151 B2
(45) Date of Patent: Dec. 23, 2025

(54) SATELLITE NETWORK CODE CACHING METHOD BASED ON NDN (NAMED DATA NETWORKING)

(71) Applicant: DALIAN UNIVERSITY, Dalian (CN)

(72) Inventors: Zhiguo Liu, Dalian (CN); Xiaoyong Jin, Dalian (CN); Yifan Li, Dalian (CN)

(73) Assignee: DALIAN UNIVERSITY, Dalian (CN)

( * ) Notice: Subject to any disclaimer, the term of this patent is extended or adjusted under 35 U.S.C. 154(b) by 283 days.

(21) Appl. No.: 18/457,353

(22) Filed: Aug. 29, 2023

(65) Prior Publication Data
US 2025/0039767 A1  Jan. 30, 2025

Related U.S. Application Data

(63) Continuation of application No. PCT/CN2023/112500, filed on Aug. 11, 2023.

(30) Foreign Application Priority Data

Jul. 25, 2023  (CN) .......................... 202310919104.1

(51) Int. Cl.
H04W 40/24    (2009.01)
G06N 3/006    (2023.01)
H04B 7/185    (2006.01)

(52) U.S. Cl.
CPC .......... *H04W 40/246* (2013.01); *G06N 3/006* (2013.01); *H04B 7/18513* (2013.01)

(58) Field of Classification Search
CPC . H04W 40/246; G06N 3/006; H04B 7/18513; H04B 7/18521; H04B 7/18584
See application file for complete search history.

(56) References Cited

U.S. PATENT DOCUMENTS

2014/0341022 A1* 11/2014 Wei .......................... H04L 47/38
                                                       370/230
2020/0067634 A1*  2/2020 Medard ................. H04L 1/0041
2023/0156826 A1*  5/2023 Palermo ............. H04B 7/18517
                                                       370/329

FOREIGN PATENT DOCUMENTS

CN    103248373 A    8/2013
CN    110622449 A    12/2019
CN    113163446 A    7/2021

OTHER PUBLICATIONS

Rodriguez Perez, Miguel, et.al., "Cache Placement in an NDN Based LEO Satellite Network Constellation", 9 pages, IEEE (Year: 2022).*

* cited by examiner

*Primary Examiner* — Liem H. Nguyen
(74) *Attorney, Agent, or Firm* — Nitin Kaushik

(57) ABSTRACT

The present invention discloses a satellite network code caching method based on Named Data Networking (NDN) and relates to the technical field of satellite network caching. Aiming at the transmission dependency generated by segmenting a content by conventional NDN caching, i.e., the problem that a user has to acquire a data block that requests a file block to be associated up and down to recover source data. The method removes the transmission dependency of data by adopting an encoding operation. To achieve efficient content distribution, the method places satellite node encoding packets by taking a minimized backhaul link load and a minimized content acquisition time delay as optimization objectives. An optimization problem is solved through a multi-population ant colony algorithm, and meanwhile, the content is retrieved rapidly.

6 Claims, 10 Drawing Sheets

SATELLITE NETWORK CODE CACHING METHOD BASED ON NDN (NAMED DATA NETWORKING)

CROSS-REFERENCE TO RELATED APPLICATIONS

The application claims priority to Chinese patent application No. 202310919104.1, filed on Jul. 25, 2023, the entire contents of which are incorporated herein by reference.

TECHNICAL FIELD

The present invention relates to the technical field of satellite network caching, and particularly relates to a satellite network code caching method based on Named Data Networking (NDN).

BACKGROUND

With proposal of 6G technology, a satellite network, as an important component therein, has gradually become a research spot presently. A satellite communication system has become assistance and expansion to a ground communication network, which not only solves the communication problem in regions with undeveloped ground network, but also improves the user experience in different network application scenarios. In the field of satellite communication, due to continuous development of the satellite technology, it is probable to deploy caching on LEO satellite nodes.

In the era of satellite Internet, the demands of users are gradually turned from simple data communication into large-scale content acquisition and distribution. Meanwhile, the content distribution mode in the current network has been turned from the way based on a content provider into a way driven by a content requester. A conventional TCP/IP-based communication pattern gradually becomes unable to fulfill the tasks. Therefore, a NDN though is imported into the satellite network, and the communication pattern of the satellite network is re-designed to better satisfy the service demands of Internet users.

Satellite network caching adopts intra-network caching based on an NDN architecture, but the transmission dependency problem will be generated when the contents are classified in conventional NDN caching, i.e., the users have to acquire data blocks that request association up and down of file blocks to recover source data.

SUMMARY

The present invention provides a satellite network code caching method based on Named Data Networking (NDN), which solves the transmission dependency problem proposed in the above background art when the contents are classified in conventional NDN caching, i.e., the users have to acquire data blocks that request association up and down of file blocks to recover source data.

The present invention provides the following technical solution: a satellite network code caching method based on Named Data Networking (NDN), on the basis of classifying the content files in conventional NDN caching, the method removes the transmission dependency by adopting an encoding operation, clusters geographical locations of satellites to simplify management of a satellite network and makes a user be capable of reducing the consumption of satellite downlinks during multiple satellite node coverage, then places a different number of encoding packets of the satellite nodes by taking a minimized backhaul link load and a minimized link content acquisition time delay as optimization objectives according to different content popularities, solves an optimization problem through a multi-population ant colony algorithm, and finally, achieves efficient content retrieval and a collaborative distribution mechanism.

A satellite network code caching method based on NDN, including the following steps:
S1: performing clustering according to geographical locations of low earth orbit (LEO) satellites to generate a plurality of LEO satellite clusters;
S2: calculating a placement number of each content encoding packet according to a content request probability;
S3: placing the encoding packets by taking a backhaul link load and a content acquisition time delay as optimization objectives; and
S4: solving a satellite encoding packet placement problem based on the multi-population ant colony algorithm.

Preferably, a cluster head of the satellite cluster is selected mainly based on connectivity degrees of the nodes, and the satellite cluster is generated by the following steps:
S1.1: calculating, by an initial stage node, the connectivity degree $degree_i$ thereof according to a formula and periodically broadcasting a hello packet for information interaction with a neighbor node to acquire the connectivity degree $degree_j$ of the neighbor node and a distance $d_{ij}$ between the nodes, and adding the above information into a neighbor list of the node, the list being in an ascending order according to the distance between the nodes;
S1.2: comparing the connectivity degree of each node with that of a neighbor node, wherein if the connectivity degree of a node is the maximum among one-hop neighbor nodes and is an unclustered node, the node itself becomes a cluster head node and broadcasts a clustered message;
S1.3: monitoring, by all the nodes, the message; if a node is not the cluster head and receives the clustered message, sending a join request to the cluster head node with the maximum connectivity degree, and selecting, by the cluster head node, nodes from top to bottom according to neighbor list nodes to join the cluster, wherein the nodes joining the cluster successfully broadcast a join message; and if nodes from the neighbor nodes of anode with the connectivity degree greater than that of the node have broadcasted the join message, the node becomes the cluster head node and broadcasts the clustered message; and
S1.4: performing multiple iteration on the above process till all nodes are classified into a cluster structure, wherein when a node enters a cluster, the cluster head node of the cluster will randomly distribute a node ID for the node.

Preferably, a calculation formula of the connectivity degree of the nodes is $$degree_i = \frac{1}{N}\sum_{t=0}^{N}\sum_{j=0, j\neq i}^{n} a'_{ij},$$

where i represents the $i^{th}$ node; and a calculation formula of the distance between the nodes is $d_{ij}=\sqrt{R_i^2+R_j^2-2R_iR_j\cos\theta}$, where $\theta$ is a geocentric angle between satellites, and $$\theta = \arccos[\sin(\varphi_i) * \sin(\varphi_j) + \cos(\varphi_i) * \cos(\varphi_j) * \cos(\lambda_i - \lambda_j)].$$

Preferably, the S2 specifically includes the following steps:

S2.1: initializing the number k of data packets, the content request probability $$p_i = \frac{1/i^\omega}{\sum_{j=1}^{N} 1/j^\omega},$$

and the number N of contents;

S2.2: calculating the number of encoding packets of each content from the first content to the $N^{th}$ content;

S2.3: adjusting the number of encoding packets on a basis of matching the number of the encoding packets based on the above request probability, wherein if $$p_i \frac{C}{m_{max}} k \leq k,$$

the number of encoding packets of a content is $$O_i = p_i \frac{C}{m_{max}} k;$$

otherwise, the number of encoding packets of the content is $$O_i = k + \frac{k}{O_1 - k}(p_i \frac{C}{m_{max}} k - k);$$

and

S2.4: calculating the number $O_i$ of encoding packets of each content;

where $O_i$ represents the number of encoding blocks of the $i^{th}$ content, $p_i$ represents the request probability of the content, C represents the size of a storage space of the satellite node, and Mn represents the largest content size.

Preferably, the S3 specifically includes the following steps:

representing a placement condition of the number of satellite encoding packets as $$O_{w_{st,i}} = \{O_{w_{st,1}}, O_{w_{st,2}}, \ldots, O_{w_{st,N}}\},$$

where $$O_{w_{st,i}}$$

represents the number the encoding packets of the $i^{th}$ file stored on the $t^{th}$ satellite of the $S^{th}$ cluster;

S3.1: setting the minimized backhaul link load as one of the optimization objectives $$\min U = \sum_{i=1}^{N} p_i \frac{m_i}{k} \left(k - \min\left\{\sum_{s=1}^{u}\sum_{t=1}^{v} O_{w_{st,i}}, k\right\}\right);$$

S3.2: setting the minimized content acquisition time delay as a second optimization objective $$\min T = \sum_i p_i Rt \left(1 - \text{sgn}\left(\sum_{t=1}^{v} O_{w_{st,i}} - k\right)\right) + p_i Ht \text{sgn}\left(\sum_{t=1}^{v} O_{w_{st,i}} - k\right),$$

where sgn is a step function; when $$\sum_{t=1}^{v} O_{w_{st,i}} - k \geq 0,$$

a function value is 1, representing that required encoding blocks can be acquired from one satellite cluster; assuming that a hop count in one cluster is H, when $$\sum_{t=1}^{v} O_{w_{st,i}} - k < 0,$$

the function value is 0, representing that the encoding blocks need to be acquired from other clusters or a content server in this case; assuming that the hop count in this case is R, H<R, where t represents a transmission time delay of one hop in an inter-satellite link;

S3.3: setting one of constraints as follows: the storage capacity of the content shall not exceed a capacity $$\sum_{i=1}^{N} O_{w_{st,i}} \frac{m_i}{k} \leq C$$

of the satellite nodes;

S3.4: setting a second constraint as follows: the number of the encoding packets of a certain content on the satellite is a positive integer from 0 to k, $$O_{w_{st,i}} = \{0, 1, \ldots, k\};$$

S3.5: setting a third constraint as follows: the number of the encoding packets stored on all satellite nodes shall not exceed the calculated number $$\sum_{s=1}^{u}\sum_{t=1}^{v} O_{w_{st,i}} \leq O_i$$

of the encoding packets of a certain content; and

S3.6: sequencing the contents in a descending order according to popularity, placing the contents in sequence from the content with the highest popularity, and solving the number of the encoding packets of each node by taking the minimized backhaul link load and the minimized content acquisition time delay as the objectives on a basis of satisfying a cache capacity constraint.

Preferably, the step of solving a satellite encoding packet placement problem based on the multi-population ant colony algorithm specifically includes the following steps:

S4.1: calculating a probability $$P^q_{(O_{w_{st,i}}, O_{w_{sr,i}})}(t)$$

that the ant q transfers from a node of the number of the encoding blocks $$O_{w_{sr,i}}$$

under a satellite node $w_{sr}$ to a node of the number of the encoding blocks $$O_{w_{st,i}}$$

under a satellite node $w_{st}$ at a time t;

S4.2: calculating an expectation degree $$\eta_{O_{w_{st,i}}, O_{w_{sr,i}}}(t)$$

that the ant transfers from a node of the number of encoding blocks $$O_{w_{sr,i}}$$

under a satellite node $w_{sr}$ to a node of the number of the encoding blocks $$O_{w_{st,i}}$$

under a satellite node $w_{st}$ at a time t;

S4.3: calculating a pheromone increment $$\Delta \tau^q_{(O_{w_{st,i}}, O_{w_{sr,i}})}(t)$$

under the two optimization objectives of the backhaul link load and the content acquisition time delay;

S4.4: calculating a local pheromone update quantity $$\tau_{O_{w_{st,i}}, O_{w_{sr,i}}}(t+1)$$

on a path;

S4.5: after independent searching once on each population, sequencing solutions searched according to a target function of the population in an ascending order;

S4.6: if a solution is superior to the worst solution searched from another population and the solution is not in a Pareto solution, adding the solution to a Pareto solution set, and performing pheromone updating on the path with $$\tau_{O_{w_{st,i}}, O_{w_{sr,i}}}(t+1) = \tau_{O_{w_{s,i}}, O_{w_{sr,i}}}(t) + e * Q;$$

S4.7: if the solution is inferior to the worst solution searched from another population or the solution is in a Pareto solution, performing pheromone updating $$\tau_{O_{w_{st,i}}, O_{w_{sr,i}}}(t+1) = (1-\rho)\tau_{O_{w_{st,i}}, O_{w_{sr,i}}}(t)$$

on the path; and

S4.8: outputting the Pareto solution set to obtain a solution variable $$O_{w_{st,i}}.$$

Preferably, the calculation formula of an ant transfer probability $$P^q_{(O_{w_{st,i}}, O_{w_{sr,i}})}(t)$$

is as follows:

$$P^q_{(O_{w_{st,i}}, O_{w_{sr,i}})}(t) = \begin{cases} \dfrac{\left[\tau_{O_{w_{st,i}}, O_{w_{sr,i}}}(t)\right]^\alpha \left[\eta_{O_{w_{st,i}}, O_{w_{sr,i}}}(t)\right]^\beta}{\sum\limits_{O_{w_{sr'},i} \in allowed_q} \left[\tau_{O_{w_{st,i}}, O_{w_{sr'},i}}(t)\right]^\alpha \left[\eta_{O_{w_{st,i}}, O_{w_{sr'},i}}(t)\right]^\beta}, & O_{w_{sr'},i} \in allowed_q \\ 0, & \text{otherwise} \end{cases}$$

where $$\tau_{O_{w_{st,i}}, O_{w_{sr,i}}}(t)$$

is a pheromone concentration on a link at a time t;

$$\eta_{O_{w_{st,i}}, O_{w_{sr,i}}}(t)$$

is a heuristic degree of the link at the time t; α and β respectively represent degrees of importance of pheromone and a heuristic function factor; and $allowed_q$ is a set of the nodes of the number of encoding blocks accessible to the ant q under the satellite node $w_{sr}$;

the calculation formula of the expectation degree $$\eta_{O_{w_{st,i}}, O_{w_{sr,i}}}(t)$$

of the ant transfer is as follows:

$$\eta_{O_{w_{st,i}},O_{w_{sr,i}}}(t) = \begin{cases} \dfrac{1}{U_{O_{w_{st,i}},O_{w_{sr,i}}}} \\ \dfrac{1}{T_{O_{w_{st,i}},O_{w_{sr,i}}}} \end{cases};$$

the calculation formula of the pheromone update quantity $$\Delta\tau^{q}_{(O_{w_{st,i}},O_{w_{sr,i}})}(t)$$

on the path is as follows:

$$\Delta\tau^{q}_{(O_{w_{st,i}},O_{w_{sr,i}})}(t) =$$
$$\begin{cases} \dfrac{Q}{\left|U_{O_{w_{st,i}},O_{w_{sr,i}}} - U_{min}\right|}, & \text{the } q^{th} \text{ ant passes throught } (O_{w_{st,i}}, O_{w_{sr,i}}) \\ 0, & \text{others} \end{cases}$$

$$\Delta\tau^{q}_{(O_{w_{st,i}},O_{w_{sr,i}})}(t) =$$
$$\begin{cases} \dfrac{Q}{\left|T_{O_{w_{st,i}},O_{w_{sr,i}}} - T_{min}\right|}, & \text{the } q^{th} \text{ ant passes throught } (O_{w_{st,i}}, O_{w_{sr,i}}) \\ 0, & \text{others} \end{cases}$$

$$U_{O_{w_{st,i}},O_{w_{sr,i}}} \text{ and } T_{O_{w_{st,i}},O_{w_{sr,i}}}$$

are respectively function values of two objectives after current search is completed; $U_{min}$ and $T_{min}$ are respectively currently found optimum function values of the two objectives; and Q is a total quantity of pheromone in one-time path-finding by one ant.

Compared with that prior art, the present disclosure has the following beneficial effects:

1. The satellite network code caching method based on NDN method removes the transmission dependency of data by adopting an encoding operation. To achieve efficient content distribution, the method places satellite node encoding packets by taking a minimized backhaul link load and a minimized content acquisition time delay as optimization objectives. An optimization problem is solved through multiple ant colony optimization, and meanwhile, the content is retrieved rapidly, and a collaborative distribution mechanism of a colony is designed, so that the user can reduce the satellite link load distributed by the content during multiple satellite node coverage while satellite network management is simplified.

2. The satellite network code caching method based on NDN performs clustering according to the geographical locations of the LEO satellites to generate a plurality of LEO satellite clusters, then calculates the placement number of each content encoding packet according to the content request probability, places the encoding packets according to the backhaul link load and the content acquisition time delay as the optimization objectives, and finally, solves the satellite encoding packet placement problem based on multiple ant colony optimization.

DETAILED DESCRIPTION OF THE EMBODIMENTS

The technical solutions in the embodiments of the present invention will be clearly and completely described below in combination with the drawings in the embodiments of the present invention. Apparently, the embodiments described are merely some rather than all of the embodiments of the present invention. On a basis of the embodiments in the present invention, all other embodiments obtained by those of ordinary skill in the art without creative efforts fall into the scope of protection of the present invention.

The objective of the present invention is to provide a satellite network code caching method based on Named Data Networking (NDN), which can achieve efficient content distribution. In order to make the above-mentioned objectives, features and advantages of the present invention more obvious and understandable, the present invention will be further described below in combination with drawings and specific embodiments.

Figure 1:
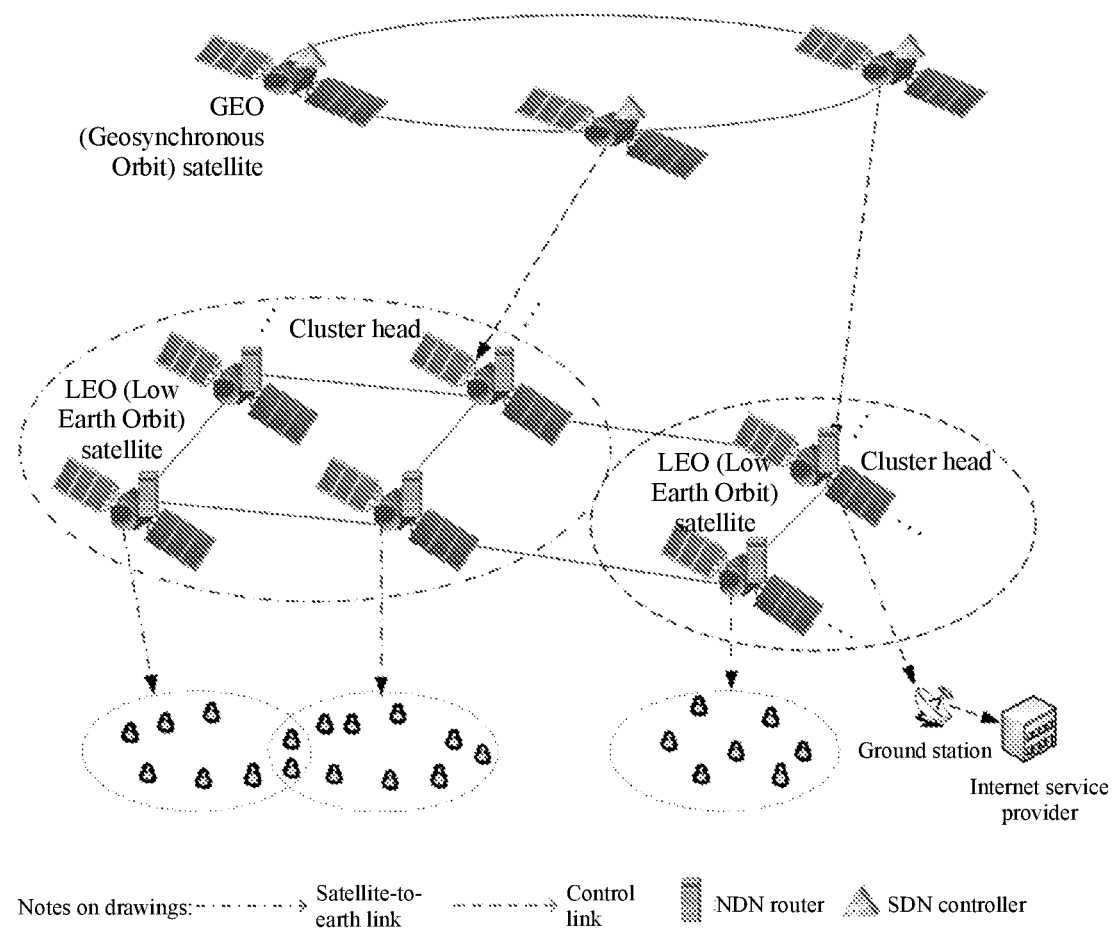
FIG. 1 is an architecture diagram of the present invention.

Based on a satellite network architecture of SDN and NDN in FIG. 1, the present invention includes an GEO layer, an LED layer and a ground layer, wherein a constellation formed by three GEO satellites is an SDN control layer, responsible for status collection of the LEO satellites and calculation of cache placing locations. The LEO satellites are equipment with NDN routers to achieve intra-network caching and content forwarding. The ground layer includes a ground station, a content service provider, and the like.

A satellite network code caching method based on Named Data Networking (NDN) provided by the embodiment, including the following steps:

S1: performing clustering according to geographical locations of low earth orbit (LEO) satellites to generate a plurality of LEO satellite clusters;

To simplify management of the satellite network and achieve the collaborative distribution mechanism of a satellite cluster, clustering is performed herein according to the geographical locations of the satellites to generate a plurality of LEO satellite clusters, and the connectivity degrees of the nodes are mainly considered in selection of the cluster head.

Satellite network topology can be viewed as a undirected graph G=(V,E), where V is a node set in the network, and E is a link set in the network. If there is a link {i,j}∈E, there is a bidirectional link between the node i and the node i for intercommunication.

As the satellite node movement has predictability and periodicity, the satellite operation period can be discretized to N small enough time slices, and it is assumed that the satellite network topology within each time slice does not change.

Needed definitions are as follows:

Definition 1: the connectivity degree degree$_i$ of the node: representing the sum of degrees when the i$^{th}$ node is connected to other nodes.

The calculation formula is as follows:

$$\text{degree}_i = \frac{1}{N} \sum_{t=0}^{N} \sum_{j=0, j \neq i}^{n} a_{ij}^t \quad (1)$$

Definition 2: geocentric angle θ: representing the geocentric angle between the two satellite nodes.

The calculation formula is as follows:

$$\theta = \arccos[\sin(\varphi_i) * \sin(\varphi_j) + \cos(\varphi_i) * \cos(\varphi_j) * \cos(\lambda_i - \lambda_j)]; \quad (2)$$

Definition 3: node distance d$_{ij}$: representing the distance between the two satellite nodes.

The calculation formula is as follows:

$$d_{ij} = \sqrt{R_i^2 + R_j^2 - 2R_iR_j\cos\theta} \quad (3)$$

S1.1: calculating, by an initial stage node, the connectivity degree degree$_i$ thereof according to a formula and periodically broadcasting a hello packet for information interaction with a neighbor node to acquire the connectivity degree degree$_i$ of the neighbor node and a distance d$_{ij}$ between the nodes, and adding the above information into a neighbor list of the node, the list being in an ascending order according to the distance between the nodes;

S1.2: comparing the connectivity degree of each node with that of a neighbor node, wherein if the connectivity degree of a node is the maximum among one-hop neighbor nodes and is an unclustered node, the node itself becomes a cluster head node and broadcasts a clustered message;

S1.3: monitoring, by all the nodes, the message; if a node is not the cluster head and receives the clustered message, sending a join request to the cluster head node with the maximum connectivity degree, and selecting, by the cluster head node, nodes from top to bottom according to neighbor list nodes to join the cluster, wherein the nodes joining the cluster successfully broadcast a join message; and if nodes from the neighbor nodes of a node with the connectivity degree greater than that of the node have broadcasted the join message, the node becomes the cluster head node and broadcasts the clustered message; and S1.4: performing multiple iteration on the above process till all nodes are classified into a cluster structure, wherein when a node enters a cluster, the cluster head node of the cluster will randomly distribute a node ID for the node.

Figure 2:
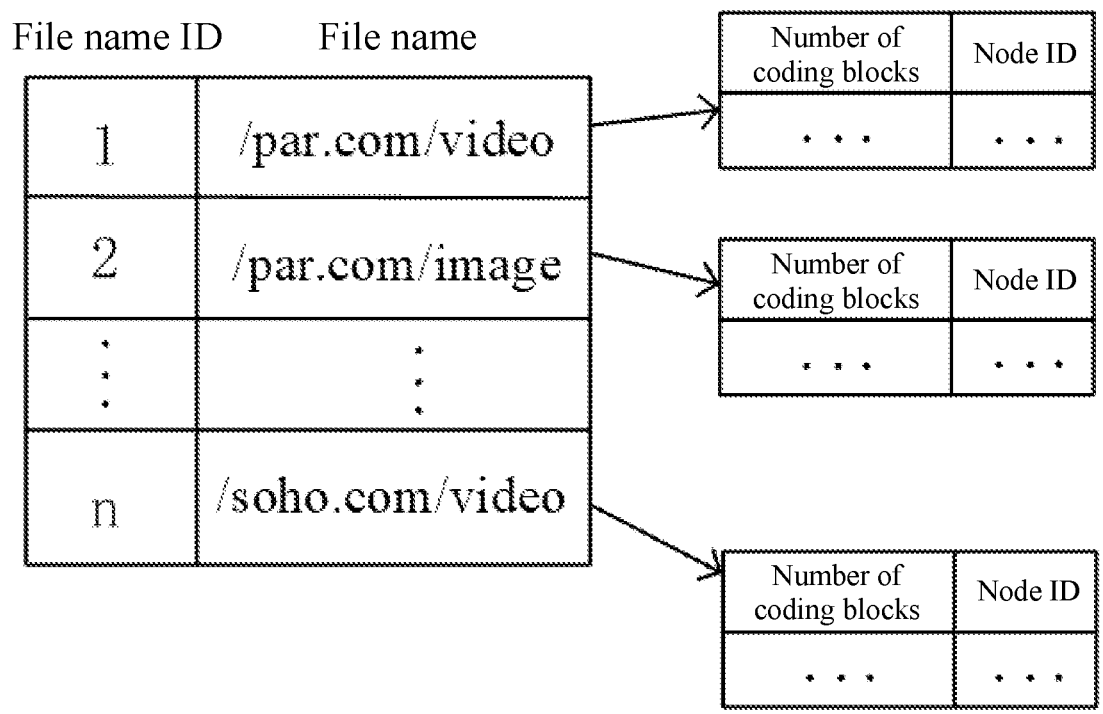
FIG. 2 is a structural diagram of a cluster head node cache table of the present invention.

In conventional NDN, each data block has a uniquely correspondingly content name. After being coded with the network, as the naming granularities of the interest packets are different, one interest name no longer corresponds to a single data packet but corresponds to a plurality of encoding packets. The user requests the content to the accessed network by sending the interest packet; the request reaching the satellite network is forwarded to the cluster head node; the cluster head node checks its own cache table; the cache table adopts a way of a second-level directory shown in FIG. 2. To reduce the number of primary-level directories of the cache table, the granularity of the content names recorded herein is file grade. If the cluster head node finds the corresponding content, it searches for secondary-level directories of the catch table, and the secondary-level directories of the catch table are arranged in a descending order according to the number of the file encoding blocks, and record the node ID of the encoding blocks. The cluster head forwards the request to the corresponding satellite nodes which retrieves its own CS table to find the stored encoding packets and distribute the same.

Figure 3:
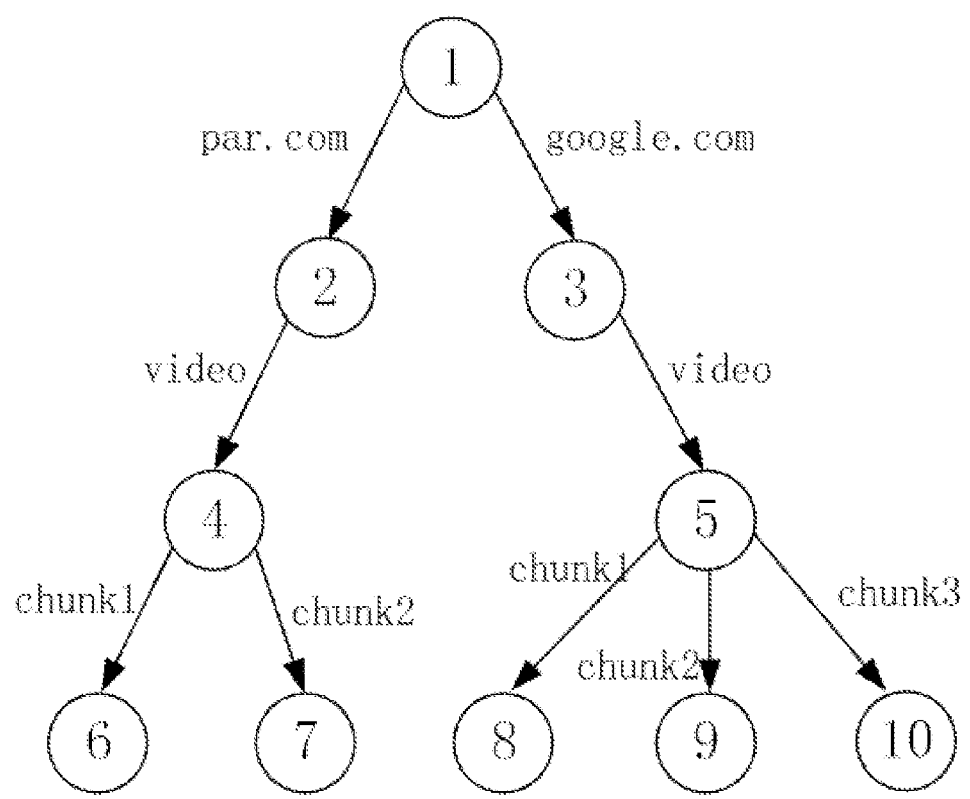
FIG. 3 is a structural diagram of a named trie of the present invention.

To reduce a number of stored entry data in the CS table of the satellite node, the data is stored by way of the named trie. Assuming that the content requested by the interest packet is /par.com/video, the node retrieves whether the prefixes of locally cached entries match with the content by way of trie. Intact series connection from a root node of the trie to any one leaf node form a content name, and meanwhile, a same name prefix is shared at the sub node of any node on a series connection path. In FIG. 3, when satellite node retrieves the node 4 to complete matching, the contents/par.com/video/chunk1 and/par.com/video/chunk2 of the leaf node of the node 4 are the needed encoding packets.

S2: calculating a placement number of each content encoding packet according to a content request probability;

S2.1: storing the different numbers of encoding packets generated according to different popularities, wherein the more popular contents generate more encoding blocks, less popular contents generate less encoding blocks, i.e., the number of the caching encoding blocks of each content is in direct proportion to its request probability; initializing the number k of data packets, the content request probability $$p_i = \frac{1/i^\omega}{\sum_{j=1}^{N} 1/j^\omega},$$

and the number N of contents;

S2.2: calculating the number of encoding packets of each content from the first content to the N$^{th}$ content;

S2.3: O$_i$ represents the number of encoding blocks of the i$^{th}$ content; for the greater p$_i$, the obtained O$_i$ may far greater than k, so that severe cache redundancy is generated; therefore, to balance the caching amount of the content, the number of the encoding packets is adjusted on the basis of matching the number of the encoding packets based on the request probability; if $$p_i \frac{C}{m_{max}} k \le k,$$

the number of the encoding packets of the content is $$O_i = p_i \frac{C}{m_{max}} k;$$

otherwise, the number of the encoding packets of the content is $$O_i = k + \frac{k}{O_1 - k}(p_i \frac{C}{m_{max}} k - k);$$

where $p_i$ represents the number of encoding blocks of the $i^{th}$ content, $p_i$ represents the request probability of the content, C represents the size of a storage space of the satellite node, and $m_{max}$ represents the largest content size;

S2.4: calculating the number $O_i$ of encoding packets of each content;

S3: placing the encoding packets by taking a backhaul link load and a content acquisition time delay as optimization objectives; and representing a placement condition of the number of the satellite encoding packets as $$O_{w_{st,i}} = \{O_{w_{st,1}}, O_{w_{st,2}}, \ldots, O_{w_{st,N}}\},$$

where $$O_{w_{st,i}}$$

represents the number the encoding packets of the $i^{th}$ file stored on the $t^{th}$ satellite of the $S^{th}$ cluster;

S3.1: setting the minimized backhaul link load as one of the optimization objectives $$\min U = \sum_{i=1}^{N} p_i \frac{m_i}{k}(k - \min\{\sum_{s=1}^{u}\sum_{t=1}^{v} O_{w_{st,i}}, k\});$$

S3.2: setting the minimized content acquisition time delay as the second optimization $$\text{objective } \min T = \sum_i p_i Rt(1 - \text{sgn}(\sum_{t=1}^{v} O_{w_{st,i}} - k)) + p_i Ht\text{sgn}(\sum_{t=1}^{v} O_{w_{st,i}} - k);$$

where sgn is a step function; when $$\sum_{t=1}^{v} O_{w_{st,i}} - k \ge 0,$$

a function value is 1, representing that required encoding blocks can be acquired from one satellite cluster; assuming that a hop count in one cluster is H, when $$\sum_{t=1}^{v} O_{w_{st,i}} - k < 0,$$

the function value is 0, representing that the encoding blocks need to be acquired from other clusters or a content server in this case; assuming that the hop count in this case is R, H<R, where t represents a transmission time delay of one hop in an inter-satellite link;

S3.3: setting one of constraints as follows: the storage capacity of the content shall not exceed a capacity $$\sum_{i=1}^{N} O_{w_{st,i}} \frac{m_i}{k} \le C$$

of the satellite nodes;

S3.4: setting a second constraint as follows: the number of the encoding packets of a certain content on the satellite is a positive integer from 0 to k, $$O_{w_{st,i}} = \{0,1, \ldots, k\};$$

S3.5: setting a third constraint as follows: the number of the encoding packets stored on all satellite nodes shall not exceed the calculated number $$\sum_{i=1}^{N} O_{w_{st,i}} \frac{m_i}{k} \le C$$

of the encoding packets of a certain content; and

S3.6: sequencing the contents in a descending order according to popularity, placing the contents in sequence from the content with the highest popularity, and solving the number of the encoding packets of each node by taking the minimized backhaul link load and the minimized content acquisition time delay as the objectives on a basis of satisfying a cache capacity constraint.

S4: solving a satellite encoding packet placement problem based on the multi-population ant colony algorithm.

In the solving process, the solving variable is $$O_{w_{st,i}};$$

the value interval of each variable is divided into $\{0, 1, \ldots, k\}$ nodes, i.e., each $$O_{w_{st,i}}$$

has k+1 selection nodes, and the ant q will select the path with high pheromone concentration as a moving direction with a higher probability.

Needed definitions are as follows:

Definition 1: ant transfer probability $$P^q_{(O_{w_{st,i}},O_{w_{sr,i}})}(t):$$

the ant q transfers from a node of the number of encoding blocks $$O_{w_{sr,i}}$$

under a satellite node $w_{sr}$ to a node of the number of the encoding blocks $$O_{w_{st,i}}$$

under a satellite node $w_{st}$ at a time t.

The calculation formula is as follows:

$$P^q_{(O_{w_{st,i}},O_{w_{sr,i}})}(t) = \begin{cases} \dfrac{[\tau_{O_{w_{st,i}},O_{w_{sr,i}}}(t)]^\alpha [\eta_{O_{w_{st,i}},O_{w_{sr,i}}}(t)]^\beta}{\sum\limits_{O_{w_{sr',i}} \in allowed_q} [\tau_{O_{w_{st,i}},O_{w_{sr,i}}}(t)]^\alpha [\eta_{O_{w_{st,i}},O_{w_{sr,i}}}(t)]^\beta}, & O_{w_{sr',i}} \in allowed_q \\ 0, & \text{otherwise} \end{cases} \quad (4)$$

where $$\tau_{O_{w_{st,i}},O_{w_{sr,i}}}(t)$$

is a pheromone concentration on a link at a time t;

$$\eta_{O_{w_{st,i}},O_{w_{sr,i}}}(t)$$

is a heuristic degree of the link at the time t; α and β respectively represent degrees of importance of pheromone and a heuristic function factor; and $allowed_q$ is a set of the nodes of the number of encoding blocks accessible to the ant q under the satellite node $w_{sr}$;

Definition 2: ant transfer exception degree $$\eta_{O_{w_{st,i}},O_{w_{sr,i}}}(t):$$

the ant transfers from a node of the number of encoding blocks $$O_{w_{sr,i}}$$

under a satellite node $w_{sr}$ to a node of the number of encoding blocks $$O_{w_{st,i}}$$

under a satellite node $w_{st}$ at a time i.

The calculation formula is as follows:

$$\eta_{O_{w_{st,i}},O_{w_{sr,i}}}(t) = \begin{cases} \dfrac{1}{U_{O_{w_{st,i}},O_{w_{sr,i}}}} \\ \dfrac{1}{T_{O_{w_{st,i}},O_{w_{sr,i}}}} \end{cases} \quad (5)$$

where the backhaul link load and the content acquisition time delay both are in reverse proportion to the expectation degree;

Definition 3: pheromone update quantity $$\Delta\tau^q_{(O_{w_{st,i}},O_{w_{sr,i}})}(t)$$

on the path: when the ant q passes through one path, the pheromone content on the path will be updated, so that the quantity of pheromone on the path increases.

The calculation formulae are as follows:

$$\Delta\tau^q_{(O_{w_{st,i}},O_{w_{sr,i}})}(t) = \qquad (6)$$

$$\begin{cases} \dfrac{Q}{|U_{O_{w_{st,i}},O_{w_{sr,i}}} - U_{min}|}, & \text{the } q^{th} \text{ ant passes through } (O_{w_{st,i}}, O_{w_{sr,i}}) \\ 0, & \text{others} \end{cases} \text{ and}$$

$$\Delta\tau^q_{(O_{w_{st,i}},O_{w_{sr,i}})}(t) = \qquad (7)$$

$$\begin{cases} \dfrac{Q}{|T_{O_{w_{st,i}},O_{w_{sr,i}}} - T_{min}|}, & \text{the } q^{th} \text{ ant passes through } (O_{w_{st,i}}, O_{w_{sr,i}}) \\ 0, & \text{others} \end{cases} \text{ ; and}$$

where, under the backhaul link load objective and the content acquisition time delay objective, when the backhaul link load and the content acquisition time delay of the selected path are smaller, the pheromone concentration on the path increases more, which enlightens more ants to select the path; therefore, the pheromone increments under the two objectives are set as follows: where $$U_{O_{w_{st,i}},O_{w_{sr,i}}} \text{ and } T_{O_{w_{st,i}},O_{w_{sr,i}}}$$

are respectively function values of the two objectives after current search is completed; $U_{min}$ and $T_{min}$ are respectively the currently found optimum function values of the two objectives; and Q is a total quantity of pheromone in one-time path-finding by one ant;

S4.1: calculating a probability $$P^q_{(O_{w_{st,i}}, O_{w_{sr,i}})}(t)$$

that the ant q transfers from a node of the number of encoding blocks $$O_{w_{sr,i}}$$

under a satellite node $w_{sr}$ to a node of the number of encoding blocks $$O_{w_{st,i}}$$

under a satellite node $w_{st}$ at a time t;

S4.2: calculating an expectation degree $$\eta_{O_{w_{st,i}}, O_{w_{sr,i}}}(t)$$

that the ant transfers from anode of the number of encoding blocks $$O_{w_{sr,i}}$$

under a satellite node $w_{sr}$ to anode of the number of encoding blocks $$O_{w_{st,i}}$$

under a satellite node $w_{st}$ at a time t;

S4.3: calculating a pheromone increment $$\Delta\tau^q_{(O_{w_{st,i}}, O_{w_{sr,i}})}(t)$$

under the two optimization objectives of the backhaul link load and the content acquisition time delay;

S4.4: calculating the pheromone update quantity $$\tau_{O_{w_{st,i}}, O_{w_{sr,i}}}(t+1) = (1-\rho)\tau_{O_{w_{st,i}}, O_{w_{sr,i}}}(t) + \sum_{q=1}^{Z}\Delta\tau^q_{(O_{w_{st,i}}, O_{w_{sr,i}})}(t)$$

on the path, wherein when the ant q passes through one path, the pheromone content on the path will be updated, so that pheromone on the path increases by $$\Delta\tau^q_{(O_{w_{st,i}}, O_{w_{sr,i}})}(t);$$

when all the ants complete one iteration, the pheromone increment on the path is $$\sum_{q=1}^{Z}\Delta\tau^q_{(O_{w_{st,i}}, O_{w_{sr,i}})}(t),$$

and $\rho$ is set as a pheromone volatile factor, and $0<\rho<1$;

S4.5: after independent searching once on each population, sequencing solutions searched according to a target function of the population in an ascending order;

S4.6: if a solution is superior to the worst solution searched from another population and the solution is not in a Pareto solution, adding the solution to a Pareto solution set, and performing pheromone updating on the path with $$\tau_{O_{w_{st,i}}, O_{w_{sr,i}}}(t+1) = \tau_{O_{w_{st,i}}, O_{w_{sr,i}}}(t) + e * Q;$$

S4.7: if the solution is inferior to the worst solution searched from another population or the solution is in a Pareto solution, performing pheromone updating $$\tau_{O_{w_{st,i}}, O_{w_{sr,i}}}(t+1) = (1-\rho)\tau_{O_{w_{st,i}}, O_{w_{sr,i}}}(t)$$

on the path; and

S4.8: outputting the Pareto solution set to obtain a solution variable $O_{w_{st,i}}$.

Figure 4:
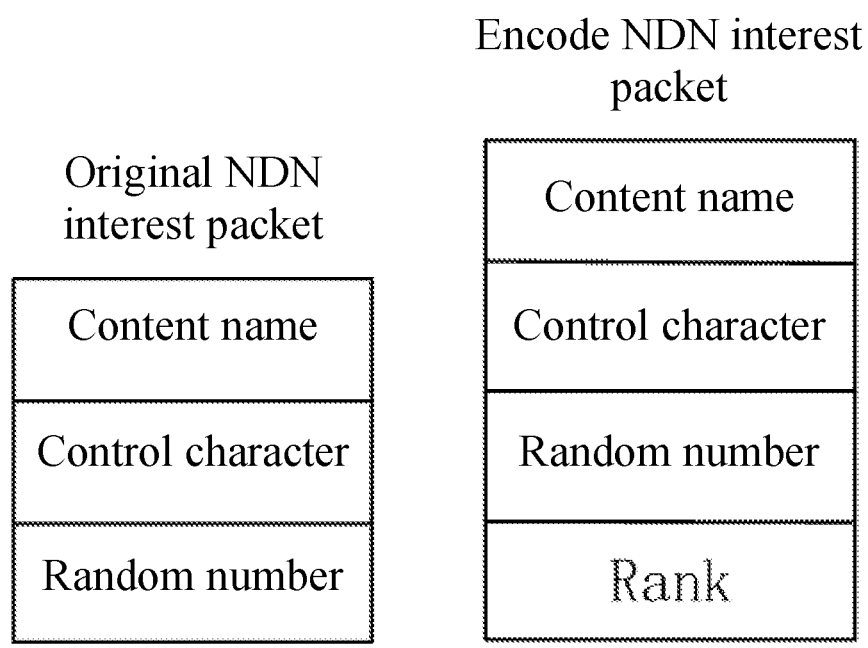
FIG. 4 is a structural diagram of an original interest packet and an encoding interest packet of the present invention.

FIG. 4 is a structural diagram of an original interest packet and an encoding interest packet. To more precisely control distribution o the encoding packets, Rank fields are added into the interest packets for marking the number of the encoding blocks needed by the user. When the user receives the encoding packets with the needed number, the user decodes and restores the encoding packets to obtain original data packets. In the distribution process of the encoding packets, the cluster head node checks the Rank fields of the interest packets and the connection of each satellite node for controlling.

Figure 5:
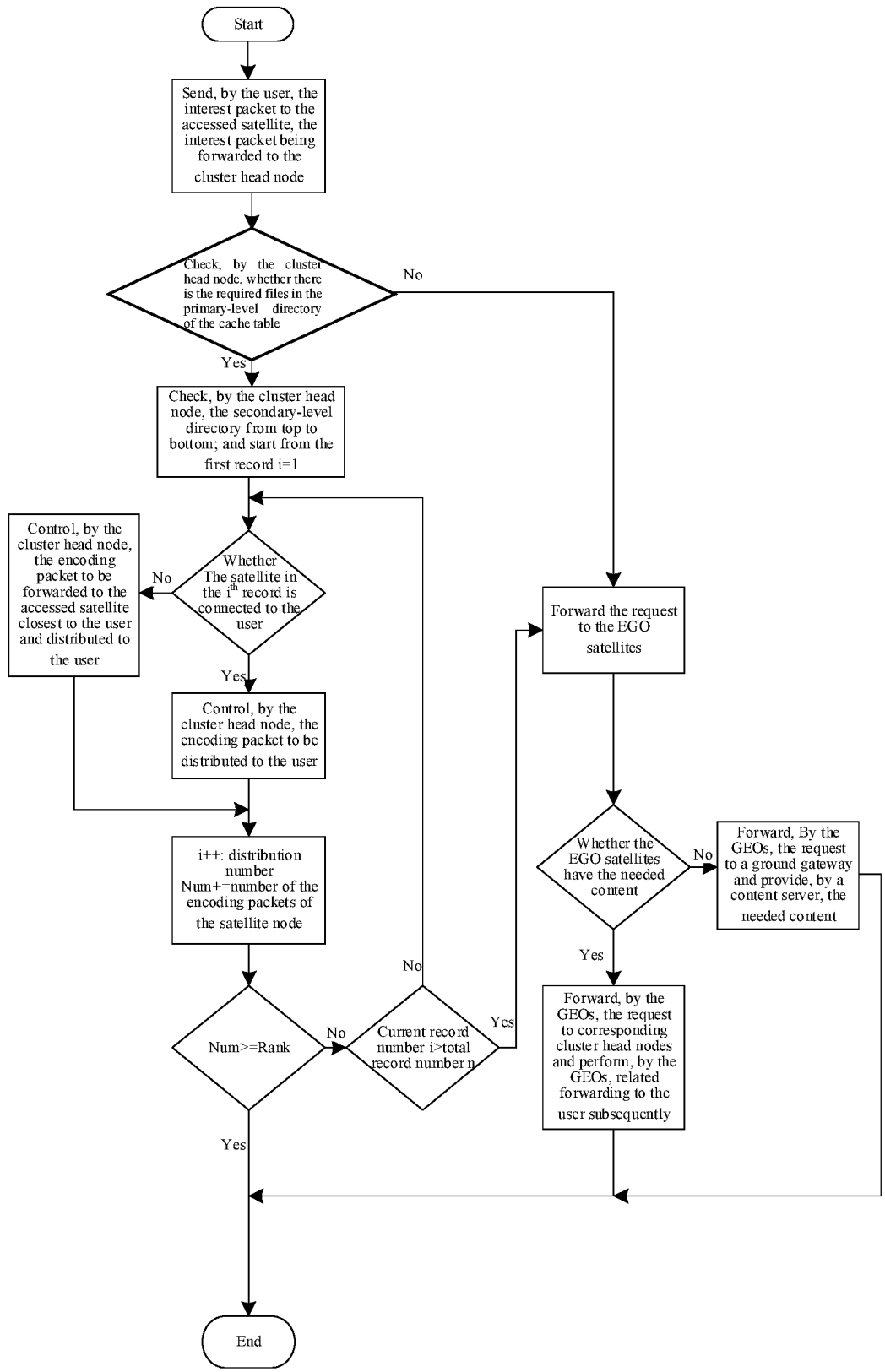
FIG. 5 is a distribution flowchart of the encoding packet of the present invention.

FIG. 5 is a distribution flowchart of the encoding packets. In the distribution process, if the needed encoding packets are found on the intra-cluster satellite and are accessed to the user, the cluster head node controls uniform distribution of the encoding packets of each satellite node; if there are the needed encoding packets on the satellite node and are not accessed to the user, the cluster head not controls the satellite node to forward the encoding packets to the satellite node accessed closest to the user and distribute the encoding packets to the user.

If the cluster head node has not found the needed contents or the number of the encoding packets controlled by the cluster head node to distribute is less than the Rank field value, i.e., the encoding packets in the cluster do not satisfy the user's need, the cluster head node forwards the interest packets to the GEO satellite and modifies the Rank field value. The GEO satellite retrieves the caching entry table of each cluster except for the cluster. If the GEO satellite has found the needed contents, they the interest packets to the corresponding cluster head nodes which retrieve the cache able to find the corresponding satellite nodes and return all cached encoding packets at the node to the satellite closest to the satellite cluster sending out the original interest packets and then distribute the encoding packets to the user.

If the GEO satellite has not retrieved the content requested by the interest packets, it forwards the request to the ground gateway to acquire the needed contents from the content server.

Figure 6:
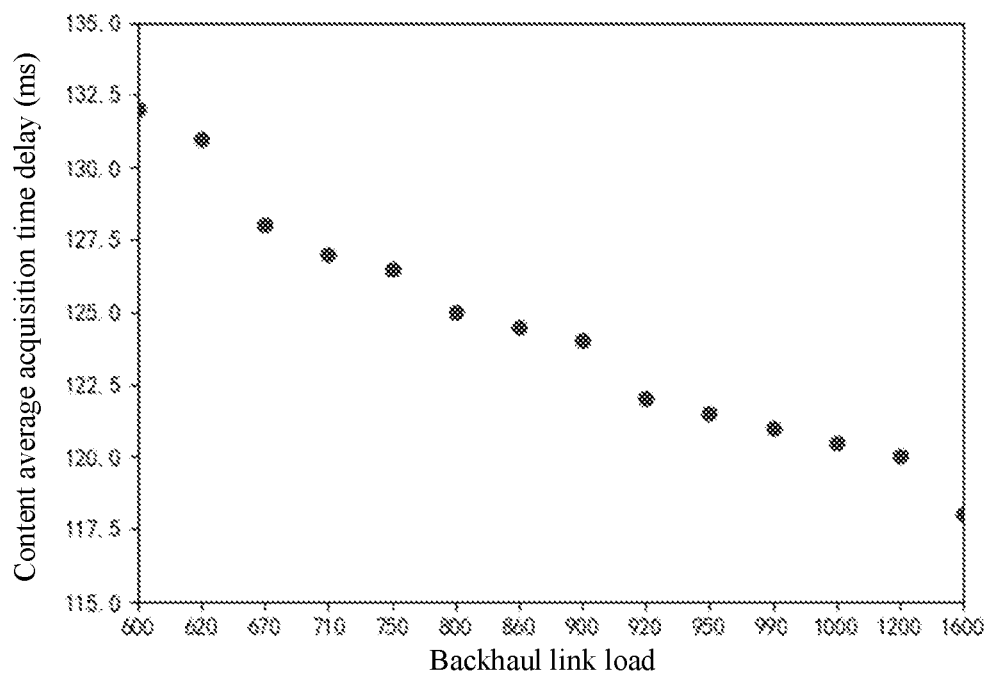
FIG. 6 is a distribution diagram of a Pareto solution of the present invention.

FIG. 6 shows distribution of the Pareto solutions of an encoding caching strategy based on multi-objective optimization when the number of the satellites accessed to the user is two. It can be seen from the figure that there are 14 Pareto solutions for the cache placement problems herein distributed uniformly, wherein each point represents a cache placement strategy satisfying Pareto.

Figure 7:
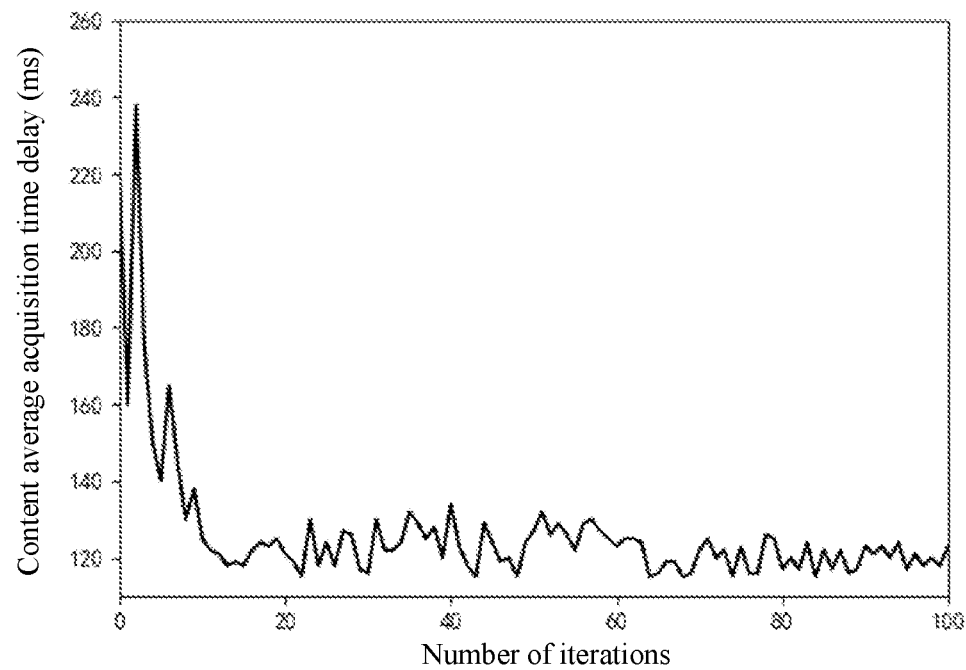
FIG. 7 is a relation diagram between a content average acquisition time delay and an iteration number of times of the present invention.

FIG. 7 is a relation diagram between a content average acquisition time delay of the user and an iteration number of times. With continuous increase of number of iterations, the content average acquisition time delay of the user decreases continuously, i.e., the individual fitness in the ant colony algorithm is improved gradually. Moreover, the fitness has a convergent tendency after about 20 times of iterations and is gradually convergent after about 60 times iterations. Meanwhile, the change data of the content average acquisition time delay of the user is fit to better represent the performance of the algorithm.

Figure 8:
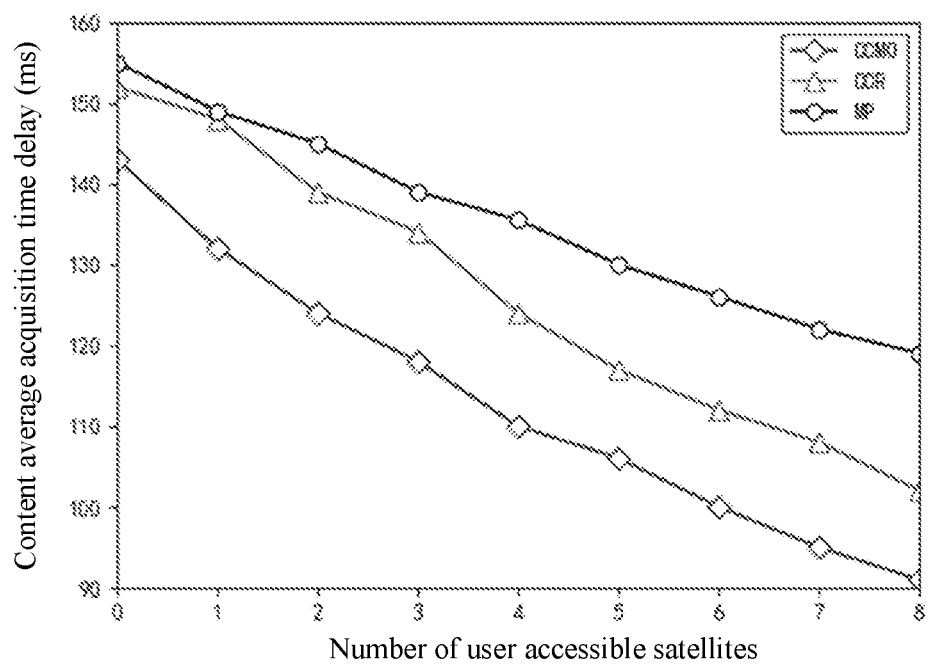
FIG. 8 is a diagram of the content acquisition time delay under different user accessible satellite node numbers of the present invention.

FIG. 8 compares the content acquisition time delays in the cache solutions under different numbers of user accessible satellite nodes. It can be seen from the figure that with increase of the user accessible satellite nodes, the content acquisition time delays of the cache solutions are somewhat reduced. When the number of the user accessible satellite nodes increases, the contents needed by the user can be better collaboratively distributed to satisfy the demand of user service within a time slot as far as possible, and the content acquisition time delays of the cache solutions are somewhat reduced. However, as encoded caching decouples the transmission dependency among the data blocks, the needed encoding packets are only transmitted when the contents needed by the user are transmitted without transmitting all contents. Compared with the most popular caching placement strategy, the content acquisition time delay is shortened. Compared with random encoding caching, the encoding caching strategy based on multi-objective optimization provided herein can select and place the popular contents more precisely, so that the content acquisition time delay is shortened.

Figure 9:
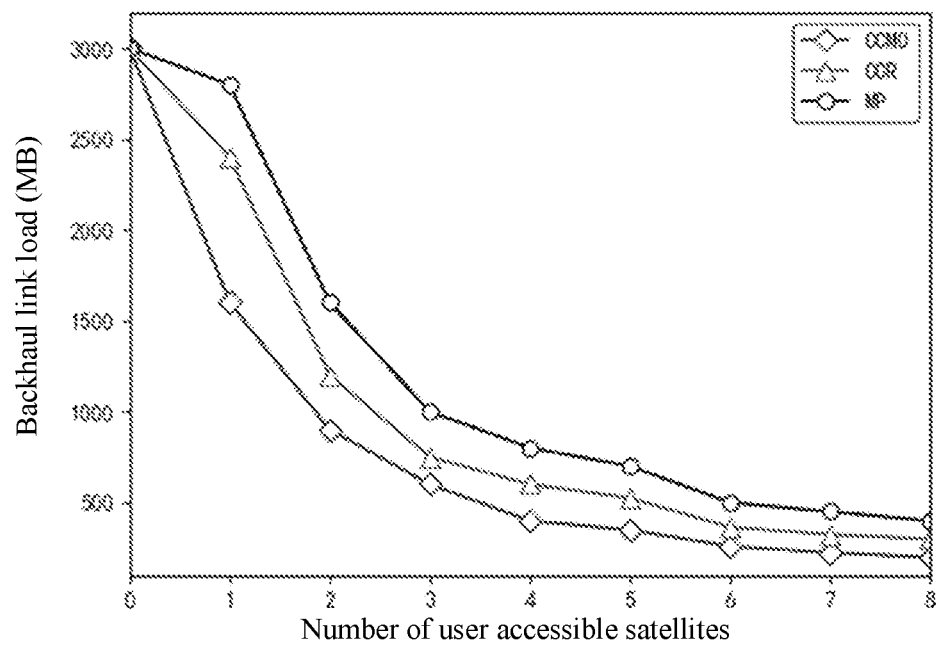
FIG. 9 is a diagram of a backhaul link load under different user accessible satellite node numbers of the present invention.

FIG. 9 compares the backhaul link loads in the cache solutions under different numbers of user accessible satellite nodes. It can be seen from the figure that with increase of the user accessible satellite nodes, the backhaul link loads of the cache solutions are somewhat reduced. When the number of the user accessible satellite nodes increase, the collaborative distribution on the content within a time slot is higher, and the collaborative distribution can reduce the backhaul link load. The minimum unit of content transmission becomes the encoding packet due to encoding caching. Therefore, compared with the most popular caching placement strategy, the backhaul link load is the lowest. Compared with the random encoding caching, the encoding caching strategy based on multi-objective optimization provided herein has the lower backhaul link load as more popular contents have been cached and these contents will be request more frequently.

Figure 10:
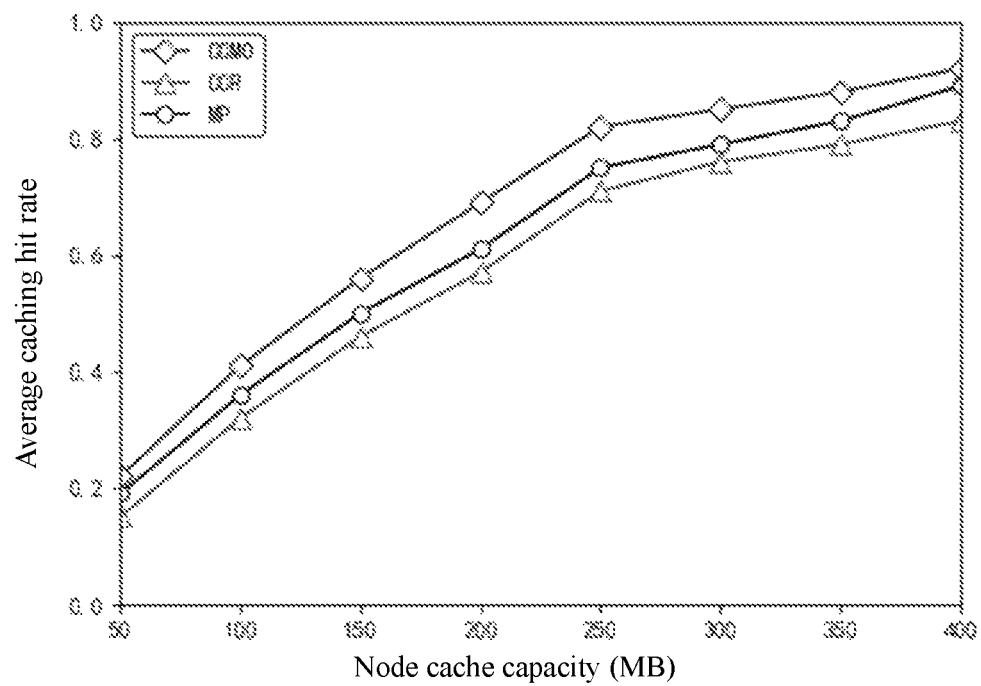
FIG. 10 is a comparison diagram of average caching hit rate of different caching policies of the present invention.

FIG. 10 compares average caching hit rates of different caching policies. The caching capacity of the node is improved, so that the contents capable of being cached increase, and the caching hit rate increases naturally. Compared with other two caching strategies, the average caching hit rate of the CCMO caching strategy provided herein is higher because compared with non-encoding caching, the encoding caching strategy herein can occupy less caching space to achieve the same caching benefit equal to that of the non-encoding caching. Compared with the CCR caching strategy, as the cached contents are popular and there are more user requests of the popular contents, the MP caching strategy can obtain a higher average caching hit rate.

The present invention provides a satellite network code caching strategy based on Named Data Networking (NDN). Aiming at the transmission dependency generated by segmenting a content by conventional NDN caching, i.e., the problem that a user has to acquire a data block that requests a file block to be associated up and down to recover source data. The method removes the transmission dependency of data by adopting an encoding operation. To achieve efficient content distribution, the method places satellite node encoding packets by taking a minimized backhaul link load and a minimized content acquisition time delay as optimization objectives. An optimization problem is solved through a multi-population ant colony algorithm, and meanwhile, the content is retrieved rapidly, and a collaborative distribution mechanism of a colony is designed, so that the user can reduce a satellite link load distributed by the content during multiple satellite node coverage while satellite network management is simplified.

Each embodiment in the description is described in a progressive manner, each embodiment focuses on the differences from other embodiments, and the same and similar parts between the embodiments may refer to each other.

Particular examples are used herein to explain the principle and embodiments of the present invention, and the above description of the embodiments is only used to help understanding the methods and core concept of the present invention; and meanwhile, alternations will be made by those skilled in the art on the specific embodiments and application range in accordance with thought of the present invention. In conclusion, the content of the description should not be construed as limitations on the present invention.

What is claimed is:

1. A satellite network code caching method based on Named Data Networking (NDN), performed by low earth orbit (LEO) satellites, wherein the method removes the transmission dependency by adopting an encoding operation, clusters geographical locations of satellites to simplify management of a satellite network and makes a user be capable of reducing the consumption of satellite downlinks during multiple satellite node coverage, then places a different number of encoding packets on the satellite nodes by taking a minimized backhaul link load and a minimized link content acquisition time delay as optimization objectives according to different content popularities, solves an optimization problem through a multi-population ant colony algorithm, and finally, achieves efficient content retrieval and a collaborative distribution mechanism;

the method comprises the following steps
- S1: performing clustering according to geographical locations of the LEO satellites to generate a plurality of LEO satellite clusters;
- S2: calculating a placement number of each content encoding packet according to a content request probability;
- S3: placing the encoding packets by taking a backhaul link load and a content acquisition time delay as optimization objectives; and
- S4: solving a satellite encoding packet placement problem based on the multi-population ant colony algorithm;

wherein the S3 specifically comprises the following steps:

representing a placement condition of the number of satellite encoding packets as $$O_{w_{st,i}} = \{O_{w_{st,1}}, O_{w_{st,2}}, \ldots, O_{w_{st,N}}\},$$

where $$O_{w_{st,i}}$$

represents the number the encoding packets of the $i^{th}$ file stored on the $t^{th}$ satellite of the $s^{th}$ cluster;

S3.1: setting the minimized backhaul link load as one of the optimization objectives $$\min U = \sum_{i=1}^{N} p_i \frac{m_i}{k}\left(k - \min\left\{\sum_{s=1}^{u}\sum_{t=1}^{v} O_{w_{st,i}}, k\right\}\right);$$

S3.2: setting the minimized content acquisition time delay as a second optimization objective $\min T =$ $$\sum_i p_i Rt\left(1 - \text{sgn}\left(\sum_{t=1}^{v} O_{w_{st,i}} - k\right)\right) + p_i Ht\text{sgn}\left(\sum_{t=1}^{v} O_{w_{st,i}} - k\right),$$

where sgn is a step function; when $$\sum_{t=1}^{v} O_{w_{st,i}} - k \geq 0,$$

a function value is 1, representing that required encoding blocks can be acquired from one satellite cluster; assuming that a hop count in one cluster is H, when $$\sum_{t=1}^{v} O_{w_{st,i}} - k < 0,$$

the function value is 0, representing that the encoding blocks need to be acquired from other clusters or a content server in this case; assuming that the hop count in this case is R, H<R, where l represents a transmission time delay of one hop in an inter-satellite link;

S3.3: setting one of constraints as follows: the storage capacity of the content shall not exceed a capacity $$\sum_{i=1}^{N} O_{w_{st,i}} \frac{m_i}{k} \leq C$$

of the satellite nodes;

3.4: setting a second constraint as follows: the number of the encoding packets of a certain content on the satellite is a positive integer from 0 to k, $$O_{w_{st,i}} = \{0, 1, \ldots, k\};$$

S3.5: setting a third constraint as follows: the number of the encoding packets stored on all satellite nodes shall not exceed the calculated number $$\sum_{s=1}^{u}\sum_{t=1}^{v} O_{w_{st,i}} \leq O_i$$

encoding packets of a certain content; and

S3.6: sequencing the contents in a descending order according to popularity, placing the contents in sequence from the content with the highest popularity, and solving the number of the encoding packets of each node by taking the minimized backhaul link load and the minimized content acquisition time delay as the objectives on a basis of satisfying a cache capacity constraint.

2. The satellite network code caching method based on NDN according to claim 1, wherein a cluster head of the satellite cluster is selected mainly based on connectivity degrees of the nodes, and the satellite cluster is generated by the following steps S1.1: calculating, by an initial stage node, the connectivity degree $\text{degree}_i$ thereof according to a formula and periodically broadcasting a hello packet for information interaction with a neighbor node to acquire the connectivity degree $\text{degree}_j$ of the neighbor node and a distance $d_{ij}$ between the nodes, and adding the above information into a neighbor list of the node, the list being in an ascending order according to the distance between the nodes;

S1.2: comparing the connectivity degree of each node with that of a neighbor node, wherein if the connectivity degree of a node is the maximum among one-hop neighbor nodes and is an unclustered node, the node itself becomes a cluster head node and broadcasts a clustered message;

S1.3: monitoring, by all the nodes, the message; if a node is not the cluster head and receives the clustered message, sending a join request to the cluster head node with the maximum connectivity degree, and selecting, by the cluster head node, nodes from top to bottom according to neighbor list nodes to join the cluster, wherein the nodes joining the cluster successfully broadcast a join message; and if nodes from the neighbor nodes of a node with the connectivity degree greater than that of the node have broadcasted the join message, the node becomes the cluster head node and broadcasts the clustered message; and S1.4: performing multiple iterations on the above process till all nodes are classified into a cluster structure, wherein when a node enters a cluster, the cluster head node of the cluster will randomly distribute a node ID for the node.

3. The satellite network code caching method based on NDN according to claim 2, wherein a calculation formula of the connectivity degree of the nodes is $$\text{degree}_i = \frac{1}{N}\sum_{t=0}^{N}\sum_{j=0, j\neq l}^{n} d_{ij}^t,$$

where i represents the $i^{th}$ node; and a calculation formula of the distance between the nodes is $d_{ij}=\sqrt{R_i^2+R_j^2-2R_iR_j\cos\theta}$, where $\theta$ is a geocentric angle between satellites, and $$\theta = \arccos[\sin(\varphi_i)*\sin(\varphi_j)+\cos(\varphi_i)*\cos(\varphi_j)*\cos(\lambda_i-\lambda_j)].$$

4. The satellite network code caching method based on NDN according to claim 1, wherein the S2 specifically comprises the following steps:

S2.1: initializing the number k of data packets, the content request probability $$p_i = \frac{1/i^\omega}{\sum_{j=1}^{N} 1/j^\omega},$$

and the number N of contents;

S2.2: calculating the number of encoding packets of each content from the first content to the $N^{th}$ content;

S2.3: adjusting the number of encoding packets on a basis of matching the number of the encoding packets based on the above request probability, wherein if $$p_i = \frac{C}{m_{max}}k \le k,$$

the number of encoding packets of a content is $$O_i = p_i \frac{C}{m_{max}}k;$$

otherwise, the number of encoding packets of the content is $$O_i = k + \frac{k}{O_1-k}\left(p_i\frac{C}{m_{max}}k-k\right);$$

and

S2.4: calculating the number $O_i$ of encoding packets of each content;

where $O_i$ represents the number of encoding blocks of the $i^{th}$ content, $P_i$ represents the request probability of the content, C represents the size of a storage space of the satellite node, and $M_{max}$ represents the largest content size.

5. The satellite network code caching method based on NDN according to claim 1, wherein the step of solving the satellite encoding packet placement problem based on the multi-population ant colony algorithm specifically comprises the following steps:

S4.1: calculating a probability $$P^q_{\left(O_{w_{st,i}},O_{w_{sr,i}}\right)}(t)$$

that an ant q is transfers from a node of the number of the encoding blocks $$O_{w_{st,i}}$$

under a satellite node $w_n$ to a node of the number of the encoding blocks $$O_{w_{sr,i}}$$

under a satellite node $W_{sr}$ at a time;

S4.2: calculating an expectation degree $$\eta_{O_{w_{st,i}},O_{w_{sr,i}}}(t)$$

that the ant transfers from a node of the number of encoding blocks $$O_{w_{sr,i}}$$

under a satellite node $W_{sr}$ to a node of the number of the encoding blocks $$O_{w_{st,i}}$$

under a satellite node $W_{st}$ at a time t;

S4.3: calculating a pheromone increment $$\Delta\tau^q_{\left(O_{w_{st,i}},O_{w_{sr,i}}\right)}(t)$$

under the two optimization objectives of the backhaul link load and the content acquisition time delay;

S4.4: calculating a local pheromone update quantity $$\tau_{O_{w_{st,i}},O_{w_{sr,i}}}(t+1)$$

on a path;

S4.5: after independent searching once on each population, sequencing solutions searched according to a target function of the population in an ascending order;

S4.6: if a solution is superior to the worst solution searched from another population and the solution is not in a Pareto solution, adding the solution to a Pareto solution set, and performing pheromone on the with updating path $$\tau_{O_{w_{st,i}},O_{w_{sr,i}}}(t+1) = \tau_{O_{w_{st,i}},O_{w_{sr,i}}}(t)+e*Q;$$

S4.7: if the solution is inferior to the worst solution searched from another population or the solution is in a Pareto solution, performing pheromone updating $$\tau_{O_{w_{st,i}}, O_{w_{sr,i}}}(t+1) = (1-\rho)\tau_{O_{w_{st,i}}, O_{w_{sr,i}}}(t)$$

on the path; and

S4.8: outputting the Pareto solution set to obtain a solution variable $$O_{w_{st,i}}.$$

6. The satellite network code caching method based on NDN according to claim 5, wherein the calculation formula of an ant transfer probability $$P^q_{(O_{w_{st,i}}, O_{w_{sr,i}})}(t)$$

is:

$$P^q_{(O_{w_{st,i}}, O_{w_{sr,i}})}(t) = \begin{cases} \dfrac{[\tau_{O_{w_{st,i}}, O_{w_{sr,i}}}(t)]^\alpha [\eta_{O_{w_{st,i}}, O_{w_{sr,i}}}(t)]^\beta}{\sum\limits_{O_{w_{sr',i}} \in allowed_q} [\tau_{O_{w_{st,i}}, O_{w_{sr,i}}}(t)]^\alpha [\eta_{O_{w_{st,i}}, O_{w_{sr,i}}}(t)]^\beta} & O_{w_{sr',i}} \in allowed_q \\ 0, & \text{otherwise} \end{cases},$$

where $$\tau_{O_{w_{st,i}}, O_{w_{sr,i}}}(t)$$

is a pheromone concentration on a link at a time t;

$$\eta_{O_{w_{st,i}}, O_{w_{sr,i}}}(t)$$

is a heuristic degree of the link at the time t: $\alpha$ and $\beta$ respectively represent degrees of importance of pheromone and a heuristic function factor; and $allowed_q$ is a set of the nodes of the number of encoding blocks accessible to the ant q under the satellite node $W_{sr}$;

the calculation formula of the expectation degree $$\eta_{O_{w_{st,i}}, O_{w_{sr,i}}}(t)$$

of the ant transfer is as follows:

$$\eta_{O_{w_{st,i}}, O_{w_{sr,i}}}(t) = \begin{cases} \dfrac{1}{U_{O_{w_{st,i}}, O_{w_{sr,i}}}} \\ \dfrac{1}{T_{O_{w_{st,i}}, O_{w_{sr,i}}}} \end{cases};$$

the calculation formula of the pheromone update quantity $$\Delta\tau^q_{(O_{w_{st,i}}, O_{w_{sr,i}})}(t)$$

on the path is as follows:

$$\Delta\tau^q_{(O_{w_{st,i}}, O_{w_{sr,i}})}(t) = \begin{cases} \dfrac{1}{|U_{O_{w_{st,i}}, O_{w_{sr,i}}} - U_{min}|}, & \text{the } q^{th} \text{ ant passes through } (O_{w_{st,i}}, O_{w_{sr,i}}) \\ 0, & \text{others} \end{cases}$$

$$\Delta\tau^q_{(O_{w_{st,i}}, O_{w_{sr,i}})}(t) = \begin{cases} \dfrac{1}{|T_{O_{w_{st,i}}, O_{w_{sr,i}}} - T_{min}|}, & \text{the } q^{th} \text{ ant passes through } (O_{w_{st,i}}, O_{w_{sr,i}}) \\ 0, & \text{others} \end{cases};$$

$$U_{O_{w_{st,i}}, O_{w_{sr,i}}} \text{ and } T_{O_{w_{st,i}}, O_{w_{sr,i}}}$$

are respectively function values of two objectives after current search is completed; $U_{min}$ and $T_{min}$ are respectively currently found optimum function values of the two objectives; and Q is a total quantity of pheromone in one-time path-finding by one ant.

\* \* \* \* \*